United States Patent Office 3,127,432
Patented Mar. 31, 1964

3,127,432
ORGANIC PHOSPHORUS-ALUMINUM COMPOUNDS AND METHOD OF PREPARATION
William K. Johnson, Dayton, Ohio, assignor to Monsanto Chemical Company, St. Louis, Mo., a corporation of Delaware
No Drawing. Filed Oct. 3, 1960, Ser. No. 59,845
8 Claims. (Cl. 260—448)

The invention relates to new and useful organic phosphorus-aluminum compounds and to a method of preparing these compounds.

The new compounds of the invention are prepared by reacting phosphites with trialkylaluminum compounds at elevated temperatures preferably in the range of about 60° C. to about 200° C., more preferably in the range of about 100° C. to about 175° C. The temperature to which the reaction mixture is most desirably heated to produce the desired compounds of the invention will vary somewhat depending on the specific reactants involved. The reactants are believed to first combine forming a complex which upon heating reacts exothermally to form the desired compounds of the invention. If desired an inert solvent preferably an aromatic or a saturated aliphatic hydrocarbon, e.g. toluene or octane, can be used, but no solvent is required for the reaction. For optimum yields it is preferred to add the reactants in about equal molar amounts.

A single phosphite can be reacted with a single trialkylaluminum compound or mixtures of either or both of the reactants can be used. The trialkylaluminum compound reactants are of the formula $AlR^1_3$ with each $R^1$ being a straight or branched chain alkyl radical, preferably having not more than about 20 carbon atoms, provided at least one of the $R^1$'s has more than one carbon atoms. The $R^1$'s of the trialkylaluminum compound can be the same or different alkyl radicals. The phosphites are of the formula $(R^2O)_3P$ with each $R^2$ being a hydrocarbon radical, preferably having not more than about 20 carbon atoms, provided that at least one of the $R^2$'s is an aliphatic, a cycloaliphatic or an araliphatic radical. The $R^2$'s of the phosphite can be the same or different hydrocarbon radicals. Especially suitable reactants are trialkylaluminum compounds wherein each alkyl group is a lower alkyl group and phosphites wherein each $R^2$ group is a lower alkyl group. Lower alkyl is defined as a straight or branched chain radical having not more than six carbon atoms. The new compound resulting from the method of the invention are compounds of the formula

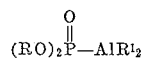

with each R being a hydrocarbon radical preferably having not more than 20 carbon atoms and $R^1$ being as defined hereinabove. As indicated by the reactants the R's can be the same or different hydrocarbon radicals. An especially desirable group of new compounds are those in which the R's and $R^1$'s are the same or different lower alkyl radicals.

One object of this invention is to provide new compounds especially useful as a reducing component in Ziegler-type catalysts.

Another object of this invention is to provide a method of making the new and useful compounds of the invention.

These and other objects of the invention will become apparent as the detailed description of the invention proceeds.

One suitable source of longer chain mixed aluminum alkyl reactants for the process of the invention is by the reaction of, e.g. aluminum triethyl with ethylene according to the method of K. Ziegler in Angewandte Chemie 64, 323 (1952). A supplemental list of trialkylaluminum reactants of the invention not meant to be limiting thereof is as follows: Dimethylethylaluminum, methyldiethylaluminum, triethylaluminum, tri-n-propylaluminum, diethyl-n-propylaluminum, triisopropylaluminum, diethyl-t-butylaluminum, tri-t-butylaluminum, triisobutylaluminum, tri-n-amylaluminum, diethylisoamylaluminum, tri-n-hexylaluminum, ethyl-di-n-octylaluminum, triisooctylaluminum, tri-n-tridecylaluminum, ethyl-di-isoheptadecylaluminum, tri-n-eicosylaluminum, etc.

Preferred phosphite reactants of the invention are those which are free of non-benzenoid unsaturation, i.e. those free of aliphatic unsaturation. At least one of the R groups of the phosphite should be a reactive group such as an aliphatic, a cycloaliphatic or an araliphatic hydrocarbon radical. It is preferred that the R groups of the phosphite be free of non-benzenoid unsaturation to obtain optimum yields of the desired product, otherwise side reactions involving aliphatic unsaturation may tend to provide undesirable by-products. The following is an illustrative not meant to be limiting list of suitable phosphite reactants of the invention: Trimethyl phosphite, diallyl ethyl phosphite, triethyl phosphite, methyl diethyl phosphite, triisopropyl phosphite, tri-t-butyl phosphite, diethyl t-butyl phosphite, tri-n-amyl phosphite, tri-isohexyl phosphite, diethyl n-octyl phosphite, tri-n-decyl phosphite, triisotridecyl phosphite, ethyl di-isoheptadecyl phosphite, tri-n-eicosyl phosphite, diethyl cyclopentyl phosphite, tricyclohexyl phosphite, tribenzyl phosphite, methyl ethyl benzyl phosphite, diethyl phenethyl phosphite, phenyl naphthyl ethyl phosphite, ethyl di-o-tolyl phosphite, di-n-propyl 3,4-xylyl phosphite, etc.

An illustrative non-limiting list of the new compounds of the invention is as follows: (Diethoxyphosphinyl)di-n-propylaluminum, (diallyloxyphosphinyl) - diethylaluminum, (methoxyethoxyphosphinyl) - diisobutylaluminum, (di-n-amyloxyphosphinyl) - di - n - hexylaluminum, (di-n-decoxyphosphinyl)-diisooctylaluminum, (ethoxy-n-heptadecoxyphonphinyl)di-eicosylaluminum, (dicyclohexoxyphosphinyl) - di - t - butylaluminum, (di-n-ethoxyphosphinyl)-di-n-octadecylaluminum, (diphenoxyphosphinyl)-diethylaluminum, (phenoxynaphthoxyphosphinyl)-di-n-decylaluminum, etc.

The invention will be more clearly understood from the following detailed description of specific examples thereof.

*Example 1*

This example describes the preparation of (diethoxyphosphinyl)-diethylaluminum. A sample of 54.2 g. 0.325 mole) of triethyl phosphite was placed in a 500 ml. round bottom, 3 neck flask fitted with a dropping funnel, magnetic stirring bar, thermometer and kerosene cooled reflux condenser. Nitrogen blanketing of the reaction mixture was used during the reaction period. Over a period of about ½ hour, 37 g. (0.325 mole) of triethylaluminum was added dropwise to the triethyl phosphite in the flask. During the additon of the triethylaluminum, the temperature of the reaction mixture rose slightly from about room temperature to about 50° C. After the triethylaluminum had been added the reaction mixture was orange-yellow in color and was not clear but turbid. A complex may have formed between the triethyl-aluminum and the triethyl phosphite. The reaction mixture was heated over a period of about 20 minutes to about 100° C. at which time the reaction became exothermic. Heating with cooling as necessary to control the exothermic reaction was continued over an additional period of about 5½ hours with the temperature of the reaction mixture over most of this period being maintained at less than 150° C. At the end of the heating period the reaction mixture was water white and clear. The reaction mixture was next distilled using a vacuum of less than about 1.0 mm. of Hg. A number of fractions were collected as follows: (1) 2 grams, B.P. 80° C., (2) 41 grams, B.P. 130–145° C., (3) 11 grams, B.P. 145–165° C., (4) 6 grams, B.P. 165–168° C., and a residue fraction of 15 grams of a yellowish straw-colored liquid. The desired product of the reaction is contained in the large fraction 41 g., i.e. fraction (2). An elemental analysis of this fraction (2) gave the following results:

| Percent | Found | Calc'd for $C_8H_{20}AlO_3P$ |
|---|---|---|
| C | 42.3 | 43.2 |
| H | 9.0 | 9.1 |
| Al | 11.9 | 12.4 |

EXAMPLE 2

This is another example of the preparation of (diethoxyphosphinyl)-diethylaluminum. The experiment of Example 2 was in general carried out in a similar manner to that of Example 1. The amount of triethylaluminum charged was 41 g. (0.36 mole) and the amount of triethyl phosphite was 59.8 g. (0.36 mole). Distillation of the reaction mixture at the end of the run in a manner similar to that described in Example 1 yielded the following fractions: (1) 4 grams, B.P. 100–134° C., (2) 56 g. B.P. 134–144° C., (3) 8 grams, B.P. 144–155° C., and a residue fraction of 18 grams. A sample of fraction (2) containing most of the desired product was submitted for elemental analysis and the results are as follows:

| Percent | Found | Calc'd for $C_8H_{20}AlO_3P$ |
|---|---|---|
| C | 43.1 | 43.2 |
| H | 9.1 | 9.1 |
| Al | 11.4 | 12.4 |

*Example 3*

This example describes the preparation of (di-n-butylphosphinyl)-diethylaluminum. This example was carried out in a manner similar to that of Example 2 using nitrogen blanketing. After the addition of a triethylaluminum to the tri-n-butyl phosphite had been completed, however, the reaction mixture was clear and straw-colored. During the later heating period the exothermic reaction did not appear to have begun until about 125° C. At the end of the heating period during which temperatures were maintained at about 150–160° C. a nearly colorless product resulted. In a similar manner to the product of Example 1, the product of Example 3 was distilled with four distillate fractions and a residue fraction being collected as follows: (1) 7 grams, B.P. 47–100° C.; (2) 10.5 grams, B.P. 100–165° C.; (3) 5 grams, B.P. 165–182° C.; (4) 82 grams, B.P. 182–210° C., and a liquid straw-colored residue fraction of 23 grams. Also there was collected in the Dry Ice trap an additional 10 gram fraction of colorless liquid. The large fraction (4) of 82 grams was redistilled collecting the following fractions: (a) 5 grams, B.P. 148–164° C., 0.5 mm.; (b) 11 grams, B.P. 164–169° C., 0.5 mm.; (c) 42 grams, B.P. 166–170° C., 0.4 mm.; (d) 10 grams, B.P. 169–169.5° C., 0.2 mm.; and a pot residue of 6 grams. An elemental analysis of a sample of fraction (c) yielded the following results:

| Percent | Found | Calc'd for $C_{12}H_{28}AlO_3P$ |
|---|---|---|
| C | 51.9 | 52.0 |
| H | 10.3 | 10.2 |
| Al | 9.3 | 9.7 |

*Example 4*

This example describes the preparation of (diphenoxyphosphinyl)-di-n-octylaluminum. This reaction is carried out in a manner generally similar to the Example 2. Amounts of reactants used are 108 gram (⅓ mole) of diphenyl cyclohexyl phosphite and 122 g. (⅓ mole) of tri-n-octylaluminum. During the heating period temperatures are maintained at not more than about 175° C. The product, (diphenoxyphosphinyl)-di-n-octylaluminum, is recovered in good yield.

*Example 5*

This example describes the preparation of (diphenoxyphosphinyl)-diisopropylaluminum. This example is carried out in a manner similar to that described in Example 2. Amounts of reactants used are 105.3 grams (⅓ mole) of diphenyl cyclohexyl phosphite and 53 g. (⅓ mole) of triisopropylaluminum. Maximum reaction temperature is maintained at below about 175° C. by cooling as necessary. The product, (diphenoxyphosphinyl)-diisopropylaluminum, is recovered in good yield.

An alternative method of carrying out the reaction is to add the trialkylaluminum to the phosphite which is maintained at reaction temperatures of the order of about 100 to 175° C.

*Example 6*

This example describes a use of the product of Example 3 with titanium tetrachloride to make a Ziegler-type polymerization catalyst and the use of this catalyst in the polymerization of ethylene. To a reactor is charged 4.0 ml. of (di-n-butylphosphinyl)-diethylaluminum, the product of Example 3, and 0.5 ml. of $TiCl_4$ in 100 ml. of isooctane. An additional amount of isooctane is added to bring the total reaction mixture to 400 ml. and ethylene is gradually added at about atmospheric pressure to the reaction mixture at 65° C. The run is conducted for about 1½ hours and a small yield of solid polyethylene is recovered. Also some liquid polymer of ethylene is produced. At the end of the run the catalyst is deactivated and the reaction stopped by the addition of methanol to the reaction mixture.

In addition to being useful as a component in making Ziegler type catalyst, the new products of the invention can be used to prepare inorganic type polymers by reaction with such material as water, ethylene glycol, adipic acid and diamines.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A method comprising reacting at elevated temperatures trialkylaluminum compounds of the formula $AlR^1_3$ wherein each $R^1$ is an alkyl radical having not more than 20 carbon atoms but at least one $R^1$ has more than one carbon atom, with phosphites of the formula $(R^2O)_3P$ wherein each $R^2$ is a hydrocarbon radical free of non-benzenoid unsaturation and having not more than 20 carbon atoms, provided that at least one of the $R^2$'s is selected from the class consisting of alkyl, cycloalkyl and aralkyl radicals, and separating the reaction product.

2. A method of claim 1 wherein $R^1$ and $R^2$ are lower alkyl radicals.

3. A method of claim 1 wherein said trialkylaluminum compound is triethylaluminum and said phopshite is triethyl phosphite.

4. A method of claim 1 wherein said trialkylaluminum compound is triethylaluminum and said phosphite is tri-n-butyl phosphite.

5. Compound of the formula

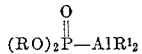

wherein each R is a hydrocarbon radical free of non-benzenoid unsaturation and having not more than 20 carbon atoms and each $R^1$ is an alkyl radical having not more than 20 carbon atoms.

6. Compounds of the formula

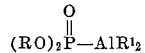

wherein each R and each $R^1$ are lower alkyl radicals.

7. (Diethoxyphosphinyl)-diethylaluminum.

8. (Di-n-butoxyphosphinyl)-diethylaluminum.

References Cited in the file of this patent

UNITED STATES PATENTS

| | | |
|---|---|---|
| 2,288,288 | Lincoln | June 30, 1952 |
| 2,922,738 | McDermott | Jan. 26, 1960 |

OTHER REFERENCES

Van Wazer: Phosphorus and its Compounds, vol. 1 (1958), pp. 198–199.